(12) United States Patent
Wiecek et al.

(10) Patent No.: US 7,891,639 B2
(45) Date of Patent: Feb. 22, 2011

(54) ALIGNED AND AXIALLY LOADED PIG INJECTOR VALVE

(75) Inventors: Boguslaw Wiecek, Edmonton (CA); Pawel Sampolski, Edmonton (CA)

(73) Assignee: 1141815 Alberta Ltd., Edmonton (CA)

( * ) Notice: Subject to any disclaimer, the term of this patent is extended or adjusted under 35 U.S.C. 154(b) by 747 days.

(21) Appl. No.: 11/815,240

(22) PCT Filed: Jan. 31, 2006

(86) PCT No.: PCT/CA2006/000137
§ 371 (c)(1),
(2), (4) Date: Aug. 1, 2007

(87) PCT Pub. No.: WO2006/081662
PCT Pub. Date: Aug. 10, 2006

(65) Prior Publication Data
US 2008/0111093 A1    May 15, 2008

(30) Foreign Application Priority Data
Feb. 3, 2005    (CA) .................................. 2496008

(51) Int. Cl.
*F16K 5/00* (2006.01)
(52) U.S. Cl. .................. 251/315.13; 251/146; 251/151; 251/315.01
(58) Field of Classification Search .................. 251/145, 251/146, 148, 151, 152, 315.01, 315.1, 315.13
See application file for complete search history.

(56) References Cited

U.S. PATENT DOCUMENTS

| 3,744,603 | A |   | 7/1973  | Garnier                     |
|-----------|---|---|---------|-----------------------------|
| 3,895,776 | A | * | 7/1975  | Laurens ............... 251/148 |
| 4,006,881 | A | * | 2/1977  | Gaillard ............... 251/214 |
| 5,104,092 | A | * | 4/1992  | Block et al. ........... 251/152 |
| 5,405,062 | A | * | 4/1995  | Torchard ............... 222/368 |
| 5,752,690 | A |   | 5/1998  | Ellett                      |
| 6,286,811 | B1| * | 9/2001  | Laskaris et al. ....... 251/315.11 |
| 6,669,171 | B1| * | 12/2003 | Stunkard ............... 251/315.08 |
| 7,604,217 | B2| * | 10/2009 | Lum ..................... 251/148 |

FOREIGN PATENT DOCUMENTS

| EP | 0231076 A1 | 8/1987 |
| GB | 1318474    | 5/1973 |
| RU | 19115 U1   | 8/2001 |

* cited by examiner

*Primary Examiner*—John K Fristoe, Jr.
(74) *Attorney, Agent, or Firm*—Terrence N. Kuharchuk; Rodman & Rodman

(57) ABSTRACT

The present invention relates to an apparatus for a flanged connection between a tubular member having a flange and a valve fitting having a valve flange and a valve body, and in particular to an apparatus for axially loading the mated threads of the valve flange and the valve body after geometrical alignment of the bolt holes of the flange on the tubular member and of the bolt holes of the valve flange.

22 Claims, 4 Drawing Sheets

ALIGNED AND AXIALLY LOADED PIG INJECTOR VALVE

FIELD OF THE INVENTION

The present invention relates to a method and apparatus for connecting two threaded members, and in particular, to a method and apparatus for axially loading the mated threads of a valve flange and a valve body while maintaining alignment of the bolt holes of the flange on a tubular member with the bolt holes of the valve flange.

BACKGROUND

A typical pipeline valve is equipped with one or more flanges. The purpose of the flanges is to allow the connection of the valve to another flanged valve, to a flanged pipe or to a flanged fitting. To enable the flange of the valve to be attached to the mating valve of the applications described above, the bolt holes on the mating flanges must be geometrically aligned.

In valve designs where it is necessary to attach the valve flange to a valve body by means of a screw thread, it is not always possible to ensure that the valve flange can be fastened to the valve body such that the bolt holes of the valve flange are in the correct geometrical alignment. It is normal to apply torque to the valve flange such that an axial loading is applied through the mating threads in order to prevent the threaded connection from becoming loose. However, when the valve flange is screwed on tight to the valve body, the bolt holes of the valve flange may not be correctly aligned.

One existing approach to the problem is to incorporate a disc type spring such that as the mating threads are screwed together, the disc spring is compressed and this provides the axial loading on the mating threads while allowing a limited rotation of the mating threaded connection in order to bring the valve flange bolt holes into the correct alignment.

Another approach to this problem is to design a deformable feature into either the valve flange or the valve body such that as the valve flange is screwed into the valve body, where the deformable feature imparts an axial loading to the mating threaded connection while allowing a limited amount of rotation of the mating threaded connection in order to bring the valve flange bolt holes into the correct alignment.

In both of the previously described approaches, axial loading is applied to the mating threads when the spring or deformable feature comes into effect. Therefore, the axial loading applied to the mating threads is affected by the need to achieve geometrical alignment of the valve flange bolt holes. Further, the resistance to rotation of the valve flange relative to the valve body is determined by the frictional resistance of the mating faces and the mating threads.

What is needed is an apparatus for applying an axial load to the mated threaded connection of a valve flange and valve body whilst permitting geometrical alignment of the bolt holes in the valve flange and providing non-frictional resistance to rotation, that overcomes the problems in the existing art.

SUMMARY OF THE INVENTION

The present invention relates to a method for connecting two threaded members of which one or both have a flange, and in particular, connecting a valve fitting with a tubular member having an attachment flange. In a preferred embodiment, the valve fitting is a pig injection valve for connection in a pipeline.

In one aspect, the invention comprises a method for connecting a first threaded member with a second threaded member, of which one or both threaded members includes a flange, comprising the step of passing an axial loading member through an opening defined by one of the two threaded members, so as to bear on the other threaded member, imparting an axial tensile force between the two threaded members.

In another aspect, the invention comprises a method of attaching a tubular member having an attachment flange defining a plurality of bolt holes to a valve fitting having a longitudinal axis for connection with a tubular member having an attachment flange, the fitting comprising:
  a valve body having an outlet, a threaded end and a loading surface; and
  a valve flange comprising a first threaded end for engaging the valve body threaded end, a flange for engaging the tubular member attachment flange, said flange defining a plurality of bolt holes, and a plurality of axial loading members each movable between a first position retracted away from the loading surface and a second extended position protruding to bear on the valve body loading surface to impart an axial tensile force between the valve body and valve flange;

wherein the method comprises the steps of:
  (a) threading the valve flange onto the valve body;
  (b) rotating the valve flange until the bolt holes on the flange of the valve flange are geometrically aligned with the bolt holes on the attachment flange of the tubular member; and
  (c) moving the axial loading member into its second extended position so that it bears on the loading surface of the valve body.

In another aspect, the invention may comprise a valve fitting having a longitudinal axis for connection with a tubular member having an attachment flange, the fitting comprising:
  (a) a valve body having an outlet, a threaded end and a circumferential loading surface at a substantially right angle to the longitudinal axis of the fitting; and
  (b) a valve flange comprising a first threaded end for engaging the valve body threaded end, a flange for engaging the tubular member attachment flange, and a plurality of axial loading members each movable between a first position retracted away from the loading surface and a second extended position protruding to bear on the valve body loading surface to impart an axial tensile force between the valve body and valve flange.

In another aspect, the invention may comprise a valve fitting apparatus having a longitudinal axis for connection with a tubular member having an attachment flange, the fitting comprising:
  (a) a valve body having a threaded end defining an outlet, and a loading surface; and
  (b) a valve flange comprising a threaded end engaging the valve body threaded end, a flange for engaging the tubular member attachment flange, and an axial loading member movable between a first position retracted away from the loading surface and a second extended position protruding to bear on the valve body loading surface to impart an axial tensile force between the valve body and valve flange.

BRIEF DESCRIPTION OF THE DRAWINGS

The invention will now be described by means of an exemplary embodiment as shown in the accompanying, simplified, diagrammatic, not to scale drawings. In the drawings.

DESCRIPTION

As used herein, any reference to "a" or "an" element shall not be construed to mean 'only one' unless it is expressly stated to do so.

As used herein, a "pig" means a device that moves through the inside of a pipeline for the purpose of cleaning, dimensioning, or inspecting.

The invention will now be described having reference to the accompanying figures. In a basic form, the invention may apply to any threaded connection between two members, to resist uncoupling of the two members or unwanted movement between the two members and to align the two members. In one embodiment, the invention has particular relevance to valve fittings within pipelines, as described below.

Figure 1:
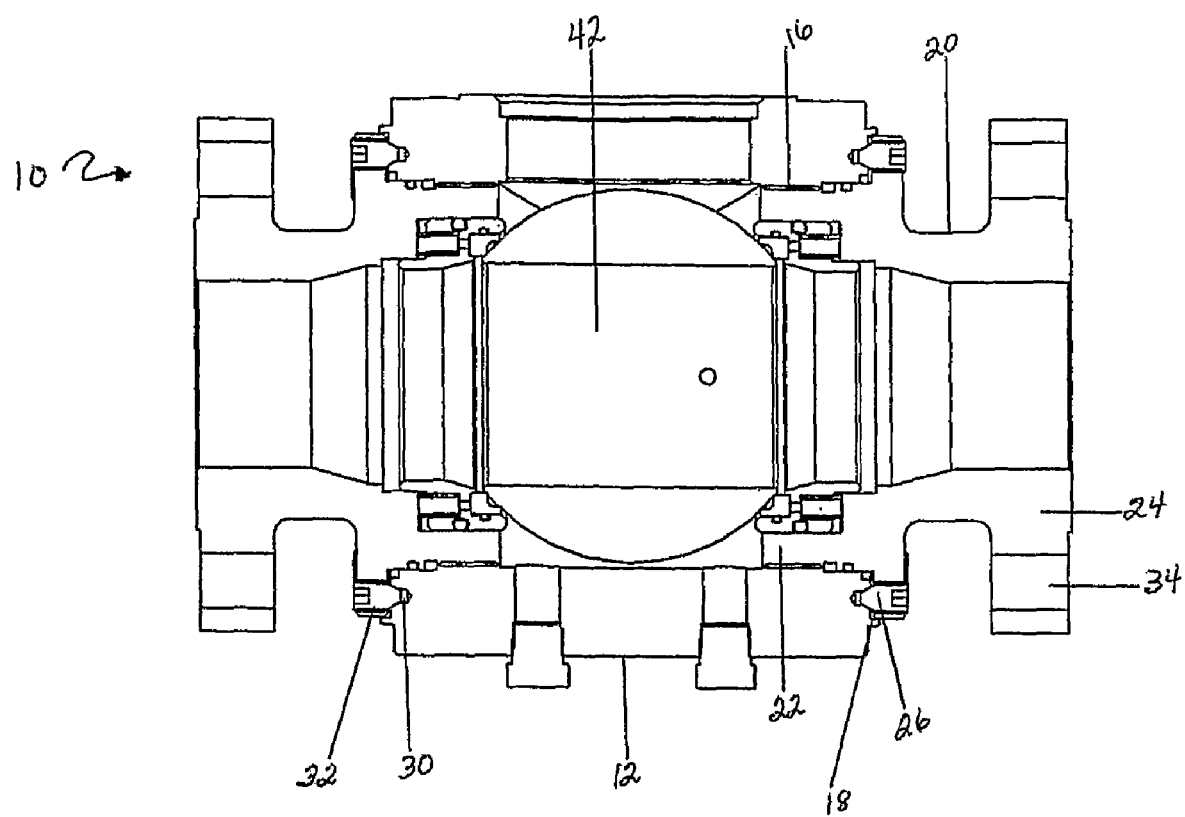
FIG. 1 is a cross sectional side view of one embodiment of the present invention.
Figure 2:
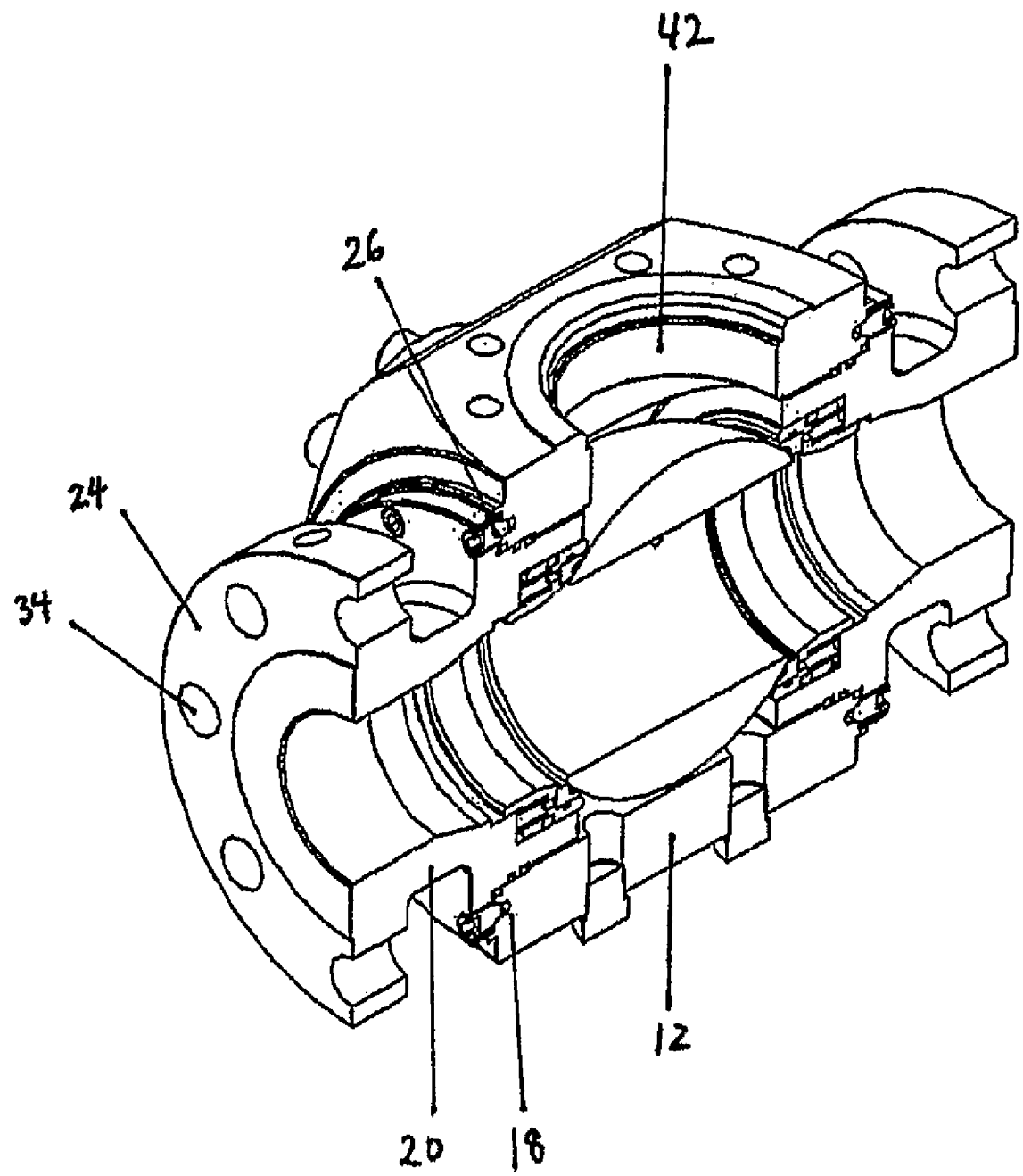
FIG. 2 is a cross sectional perspective view of one embodiment of the present invention.

As depicted in FIGS. 1 and 2, the apparatus comprises a valve fitting (10) having a valve flange (20) and a valve body (12). In a preferred embodiment, the valve fitting is a pig injection valve as shown in the Figures. Accordingly, the valve body (12) has an outlet at each end which are both threaded (22). The threaded outlets each attach to a valve flange (20). However, the valve body (12) may have any number of threaded outlets depending on the type of valve fitting. For example, a 'T' valve fitting may have three threaded outlets, and a cross valve fitting may have four threaded outlets. The valve body (12) also has at least one loading surface (18) used to axially load the threaded connection between the valve body (12) and the valve flange (20) as described below. In a preferred embodiment, the loading surface is a circumferential shoulder which is substantially at a right angle to the longitudinal axis of the valve fitting.

The valve flange (20) comprises a flange (24), a threaded end (22) that engages the threaded end of the valve body (22), and at least one axial loading member (26). Suitable seals such as O-rings may be provided between the valve flange (20) and the valve body (22) as is well known in the art.

In a preferred embodiment, there are a plurality of axial loading members. The axial loading member (26) is movable between a first position whereby it is retracted away from the loading surface when the valve flange is connected to the valve body, and a second position where it protrudes to bear upon the loading surface (18). In a preferred embodiment, the axial loading members are substantially parallel to the longitudinal axis of the valve fitting and move along a parallel axis.

Figure 3:
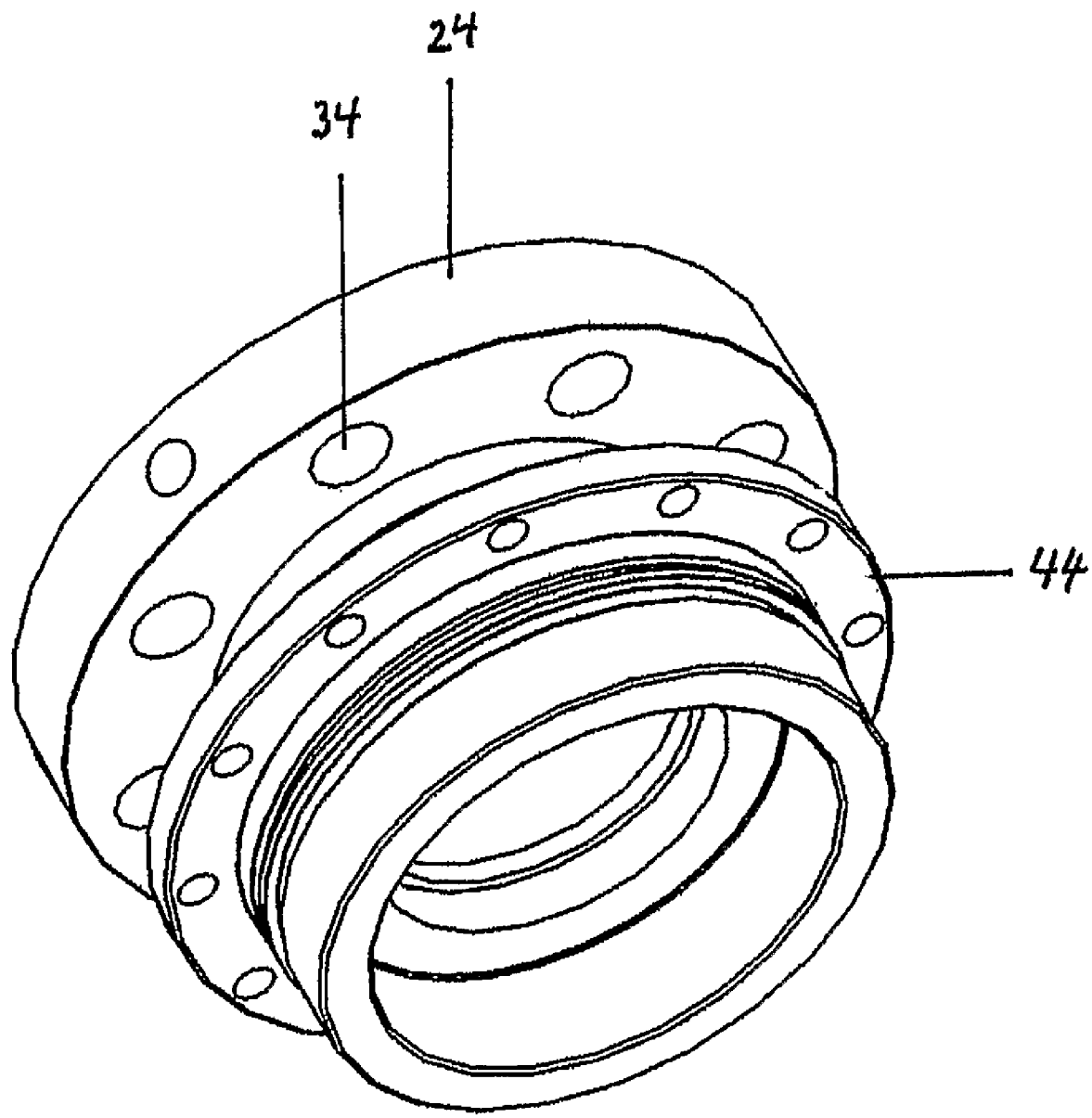
FIG. 3 is a diagrammatic depiction illustrating the alignment of the bolt holes of mating flanges of one embodiment of the present invention.

The flange (24) on the valve flange (20) defines a series of bolt holes (34) that correspond geometrically with bolt holes on the flange of the tubular member (44) to which the valve fitting (10) is being connected. FIG. 3 illustrates the required alignment of the connectors, or bolt holes, in the flange of the tubular member (44) with those bolt holes in the valve flange (34).

In one embodiment the axial loading member (26) is housed within a passage (32) in an abutment of the valve flange (20). The interior surface of the passage (32) and the exterior surface of the axial loading member (26) may be configured with complementary threads (not shown in the diagrams) so that the axial loading member (26) can be moved into its second extended position by rotating it within the passage (32). The axial loading member (26) may be a set screw, however such other means as are commonly used to retract and extend members in the art may utilized.

In a preferred embodiment, the set screws (26) may have a tapered point and the loading surface (18) on the valve body (12) defines a number of recesses (30) to receive the set screws (26) when extended into their second extended position. It should be understood that a plurality of axial loading members, loading surfaces and recesses can be utilized with the present invention. Accordingly, when the set screws are extended and engaged in the recesses, it will be apparent that the set screws impart an axial tensile force between the valve body (12) and the valve flange (22). As well, the valve body and the valve flange cannot be rotated relative to each other without shearing the set screws. As used herein, an "axial tensile force" is a force which tends to separate the valve body and the valve flange, along their longitudinal axes.

Once the valve flange threads (22) and the valve body threads (16) have been engaged, the axial loading member (26) is moved into its second extended position so that it protrudes into the recess (30) and bears on the loading surface (18). As torque is applied to the axial loading member (26), a resulting axial tensile force is applied between the valve body (12) and the valve flange (20). In other words, the axial loading members impart a force tending to separate the valve body (12) and the valve flange (20). This results in an axial loading being applied through the mated threads of the valve flange (20) and the valve body (12). Thus, unwanted loosening of the mated threads is prevented by the extended axial loading member (26) and friction in the threaded connection. Once the flange (24) is aligned with the pipeline flange, the threaded connection between the valve body and the valve flange can be axially loaded without further rotation of the valve flange.

Figure 4:
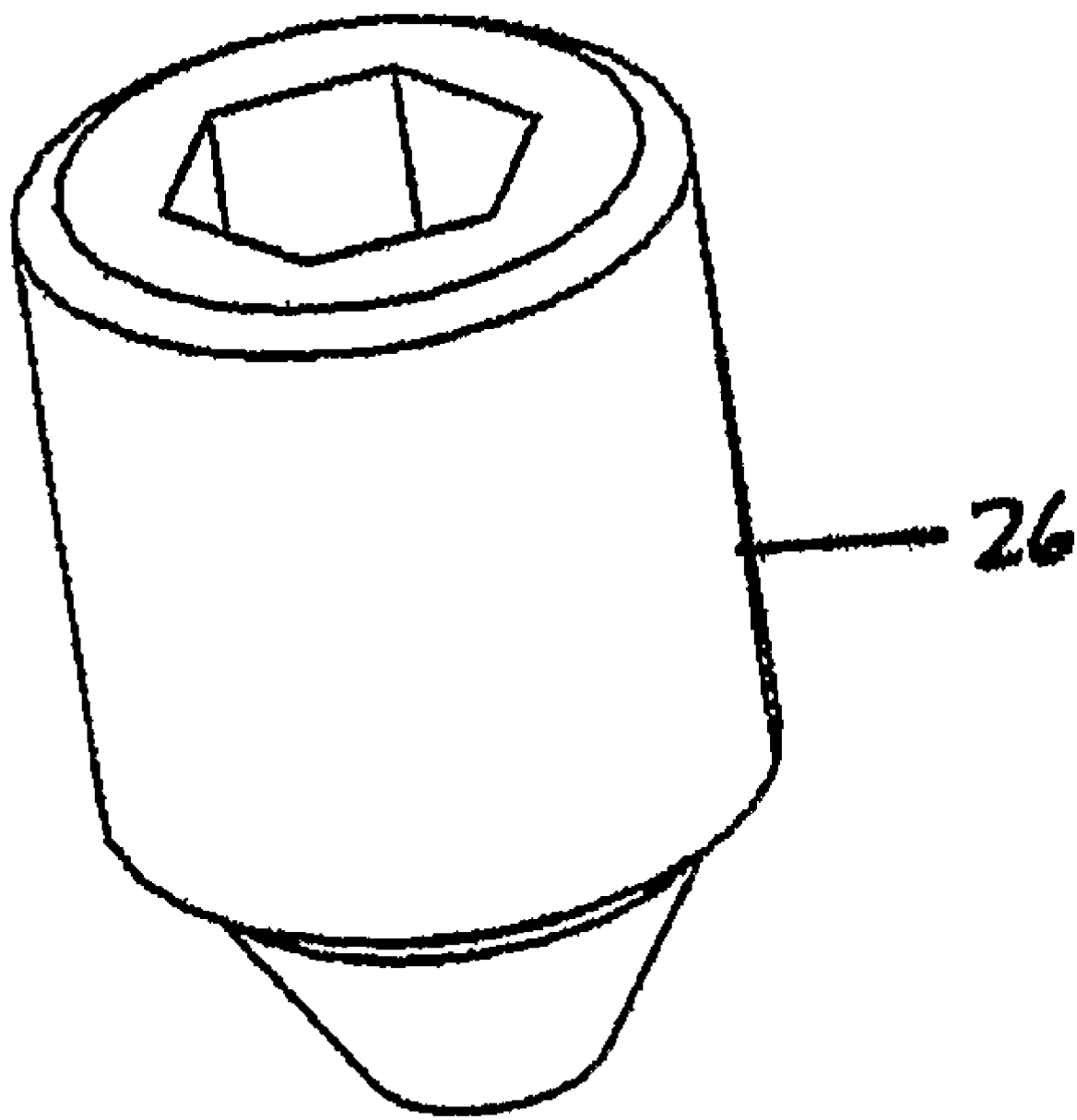
FIG. 4 is a diagrammatic depiction of the axial loading member of one embodiment of the present invention.

In a preferred embodiment, the axial loading member (26) comprises a conical point screw housed in a passage (32), and the use of a conical shaped recess (30) in the loading surface (18). The end of the conical point screw mates with the conically shaped recess (30) on the loading surface (18) ensuring that each axial loading member (26) contributes to axial loading and also shear resistance to rotation. FIG. 4 is a diagrammatic depiction of a conical point screw suitable for use with the present invention. A specified amount of torque may be applied to each axial loading member (26) to attain an appropriate amount of axial loading.

The valve fitting (10) may be a ball valve, or such other suitable valve fitting as would be selected by one skilled in the art. As depicted in FIG. 2, the valve fitting may be suitable for use for inserting or extracting pigs from a pipeline, and may be a pig injector valve having an aperture (42) and a sealing cap (not shown).

The valve fitting (10) may be constructed from any suitable material including, without limitation, suitable metals or alloys thereof, or suitable plastic or composite materials.

The use of the invention will now be described having reference to FIGS. 1 and 2. The valve body (12) and the valve flange (20) are screwed together. The valve flange (20) is rotated until the bolt holes in the flange (24) are geometrically aligned with the bolt holes in the attachment flanges (44) of the tubular member that the valve fitting (10) is being attached to. One particularly effective method is to thread together the valve flange and the valve body until no further rotation is possible. The valve flange can then be reversed slightly until the bolt holes are aligned. With a typical bolt pattern of a pipeline attachment flange, this may be accomplished with less than a 90° turn.

The set screws (26) are then rotated, extending them into their second extended position whereby they bear upon the loading surface (18) of the valve body (12). Sufficient torque is applied to the set screws (26) to axially load the mated threads enough that the threads become frictionally engaged. The flange (24) on the valve flange (20) and the attachment valve (44) on the tubular member are then bolted together. Alternatively, the flanges may be bolted together before the axial loading members are extended into their second position. This process is repeated if the valve fitting (10) has a second threaded end for attachment to a second tubular member.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

We claim:

1. A valve fitting having a longitudinal axis for connection with a tubular member having an attachment flange, the fitting comprising:
    (a) a valve body having a threaded end defining an outlet, and a loading surface;
    (b) a valve flange comprising a threaded end engaging the valve body threaded end, a flange for engaging the tubular member attachment flange, and at least one axial loading member movable between a first position retracted away from the loading surface and a second extended position protruding to bear on the valve body loading surface to impart an axial tensile force between the valve body and valve flange; and
    (c) the loading surface of the valve body defining a recess for receiving the axial loading member when in its second extended position.

2. The valve fitting of claim 1 wherein the valve fitting is a pig injector valve for connection in a pipeline.

3. The valve fitting of claim 1 wherein the recess is conical.

4. The valve fitting of claim 3 wherein the axial loading member has a tapered end for receipt in the recess.

5. The valve fitting of claim 4 wherein the valve fitting is a pig injector valve for connection in a pipeline.

6. The valve fitting of claim 1 wherein the axial loading member is substantially parallel to the longitudinal axis of the valve fitting.

7. The valve fitting of claim 1 wherein the valve flange further comprises an abutment which abuts or is in close proximity to the loading surface and which defines a passage for receiving the axial loading member.

8. The valve fitting of claim 7 wherein the axial loading member comprises a set screw and the passage is threaded.

9. The valve fitting of claim 8 wherein the axial loading member is a set screw having a tapered end.

10. The valve fitting of claim 1 wherein the valve fitting is a ball valve for the insertion or extraction of pigs from a pipeline.

11. The valve fitting of claim 10 wherein the valve fitting is a pig injector valve having an aperture and a sealing cap.

12. The valve fitting of claim 1 wherein the axial loading member has a tapered end for receipt in the recess.

13. The valve fitting of claim 12 wherein the axial loading member is substantially parallel to the longitudinal axis of the valve fitting.

14. The valve fitting of claim 13 wherein the valve flange further comprises an abutment which abuts or is in close proximity to the loading surface and which defines a passage for receiving the axial loading member.

15. A valve fitting having a longitudinal axis for connection with a tubular member having an attachment flange, the fitting comprising:
    (a) a valve body having an outlet, a threaded end and a circumferential loading surface at a substantially right angle to the longitudinal axis of the fitting; and
    (b) a valve flange comprising a first threaded end for engaging the valve body threaded end, a flange for engaging the tubular member attachment flange, and a plurality of axial loading members each movable between a first position retracted away from the loading surface and a second extended position protruding to bear on the valve body loading surface to impart an axial tensile force between the valve body and valve flange; and
    (c) a plurality of recesses in the loading surface of the valve body for receiving the axial loading members when in their second extended positions.

16. The valve fitting of claim 15 wherein each axial loading member has a tapered end for receipt in one of the plurality of recesses.

17. The valve fitting of claim 16 wherein the valve flange further comprises an abutment which abuts or is in close proximity to the loading surface and which defines a plurality of passages for receiving the plurality of axial loading members.

18. The valve fitting of claim 15 wherein each of the plurality of recesses is conical.

19. The valve fitting of claim 18 wherein each axial loading member has a tapered end for receipt in one of the plurality of recesses.

20. The valve fitting of claim 15 wherein the valve flange further comprises an abutment which abuts or is in close proximity to the loading surface and which defines a plurality of passages for receiving the plurality of axial loading members.

21. The valve fitting of claim 20 wherein each axial loading member comprises a set screw and wherein each passage is threaded.

22. The valve fitting of claim 15 wherein the valve fitting is a pig injector valve for connection in a pipeline.

* * * * *